Patented May 13, 1952

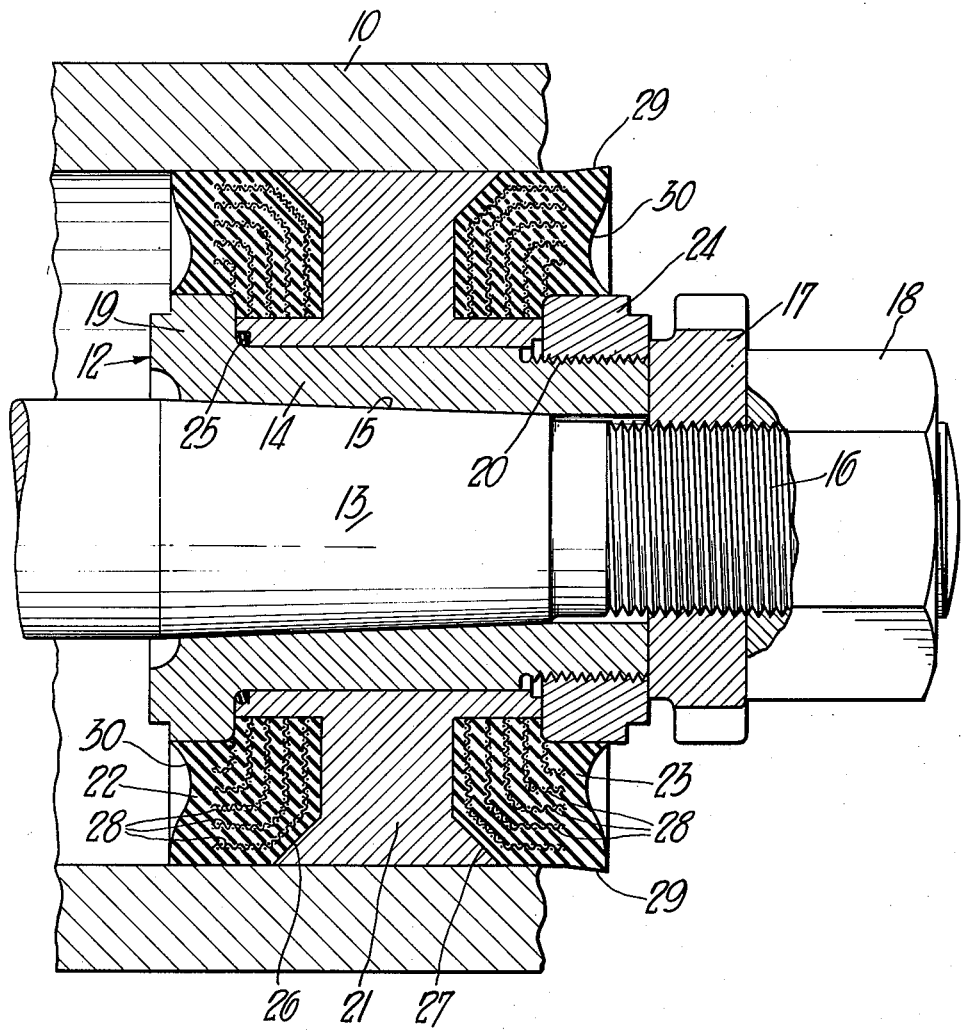

2,596,703

UNITED STATES PATENT OFFICE 2,596,703

SLUSH PUMP PISTON

August R. Maier, Dallas, Tex., assignor to United States Steel Company, a corporation of New Jersey Application July 27, 1948, Serial No. 40,813

2 Claims. (Cl. 309—4)

This invention relates to improvements in pistons for pumps and the like.

Pistons embodying the present invention are especially suited for slush pumps used in well drilling, although obviously the invention is not thus limited. These pumps force mud suspensions through drill holes at very high pressures. The pistons not only must withstand such pressures and the abrasive action of the drilling mud frequently laden with sand without leakage, but also they must withstand repeated sudden reversals in the direction from which the pressure is applied. Commonly these pistons have reinforced rubber packing rings which engage the cylinder lining and which usually are the first part of the piston to fail or to require replacement.

The principal object of the present invention is to provide improved pistons which withstand high pressures better and through a longer life than previous pistons with which I am familiar.

A further object of the invention is to provide reinforced rubber packing rings for pistons in which the reinforcement is of improved construction and design and effectively lengthens the life of packing rings.

In accomplishing these and other objects of the invention, I have provided improved details of structure, a preferred form of which is shown in the accompanying drawing, in which the single figure is a longitudinal sectional view of a piston embodying features of the present invention.

Referring more in detail to the drawing:

There is shown at 10 a portion of a pump cylinder lining which contains a reciprocable piston 12 mounted on a piston rod 13. Said piston comprises a metal sleeve-like body 14, which has a tapered central bore 15. The piston rod has a tapered section which is received within said bore. The extremity of the piston rod has a screw-threaded section 16. A nut 17 and a lock nut 18 are engaged with said threaded section, and when tightened force the body into tight wedging engagement with the tapered section of the piston rod.

The outer end of body 14 has an integral collar 19 and the inner end has a screw-threaded section 20. A unit comprising a metal spacer 21, which carries outer and inner packing rings 22 and 23, is fitted over the sleeve and fixed thereon by a nut 24 engaged with threads 20. The inside portion of spacer 21 extends the full length between collar 19 and nut 24. The spacer thus furnishes metal-to-metal engagements with the collar and nut for holding the piston assembled, and there is no reliance on the rubber packing rings, which distort under high pressures. The threaded connection of nut 24 on the body does not necessarily afford a leakproof joint at the high pressures encountered. Therefore the inner circumference of spacer 21 is recessed and receives a rubber sealing ring 25.

The outer circumference of spacer 21 has annular lips 26 and 27 which overlap the edges of packing rings. The inside faces of the lips taper inwardly, preferably at an angle of about 45 degrees. The extremities of the lips preferably terminate in relatively sharp edges.

As a further feature of the present invention, each of the packing rings has a series of nesting, cup-shaped fabric reinforcing layers 28 which terminate short of the end extremities of the rings. These rings are preformed and molded into the rubber matrix of the rings. Near the outside of the rings the reinforcing layers are parallel to the direction of piston travel. In previous arrangements with which I am familiar the reinforcing layers have been flat throughout and have been in planes perpendicular to the direction of piston travel. Reversals have tended to separate the layers and thus to cause failure of the rings. Where flat reinforcements are used, the pressure exerted against the piston also makes the rubber flow out between the reinforcing rings, resulting in loss of piston rubber volume and causing rapid deterioration of the entire piston. The improved arrangement of the present invention overcomes this tendency since the packing rings are reinforced in the direction in which stresses are applied. The extremities of the packing rings flare outwardly as indicated at 29 and their faces are dished as indicated at 30. The flaring extremities are thus forced into tight engagement with the cylinder lining and the intersection of the heels with the piston liner is at an angle less than a right angle. Other pistons now used have right angle intersections at the heel. The arrangement of the present invention furnishes better resistance to the squeezing action of the pressure, which at present causes most piston failures to begin at the right angle intersection of the heel where liner contact is made.

From the foregoing description it is seen I have provided improved pistons of simplified construction which have better wearing characteristics than previous pistons with which I am familiar. The term "rubber" as used in the specification and claims is to be construed in its generic sense, that is, as including various synthetics and plastics suitable for the purpose, as well as natural rubber.

While I have shown and described only a single embodiment of the invention, it is apparent that modifications may arise. Therefore, I do not wish to be limited to the disclosure set forth but only by the scope of the appended claims.

I claim:

1. A pump piston comprising a sleeve-like metal body adapted to be fitted over a piston rod and having an integral collar at one end and a screw-threaded portion at the other end, a metal spacer removably fitted over said sleeve and having integral tubular extensions from each end at its inner circumference, one of said extensions abutting said collar and the other extension terminating over said screw-threaded portion, said spacer having a pair of lips at its outer circumference overhanging said extensions, a pair of reinforced packing rings carried by said spacer, each of which is positioned over a different one of said extensions and confined around one end by one of said lips, and a nut threadedly engaged with said screw-threaded portion and abutting said other extension and thus compressing said packing rings, the metal-to-metal contacts between said spacer and said collar and said nut furnishing rigidity throughout the length of the piston, said spacer and said packing rings being removable and replaceable as a unit.

2. A pump piston comprising a sleeve-like metal body adapted to be fitted over a piston rod and having an integral collar at one end and a screw-threaded portion at the other end, a metal spacer removably fitted over said sleeve and having integral tubular extensions from each end at its inner circumference, one of said extensions abutting said collar and the other extension terminating over said screw-threaded portion, said spacer having a pair of lips at its outer circumference overhanging said extensions, a pair of reinforced rubber packing rings carried by said spacer, each of which is positioned over a different one of said extensions and confined around one end by one of said lips, the reinforcement in said packing rings being a plurality of nested cup-shaped fabric layers imbedded in the rubber and having outer plies extending parallel to the direction of piston travel, the exposed end faces of said packing rings being dished, and a nut threadedly engaged with said screw-threaded portion and thus compressing said packing rings, the metal-to-metal contacts between said spacer and said collar and said nut furnishing rigidity throughout the length of the piston, said spacer and said packing rings being removable and replaceable as a unit.

AUGUST R. MAIER.

REFERENCES CITED

The following references are of record in the file of this patent:

UNITED STATES PATENTS

| Number | Name | Date |
|---|---|---|
| 1,273,738 | Christenson | July 23, 1918 |
| 2,216,291 | Caldwell | Oct. 1, 1940 |
| 2,218,638 | Christenson | Oct. 22, 1940 |
| 2,267,882 | Wilson | Dec. 30, 1941 |
| 2,277,501 | Murray | Mar. 24, 1942 |
| 2,306,800 | Caldwell | Dec. 29, 1942 |
| 2,388,520 | Bowie | Nov. 6, 1945 |
| 2,450,693 | Sanders | Oct. 5, 1948 |